United States Patent Office 3,457,294
Patented July 22, 1969

3,457,294
N-(SUBSTITUTED-BENZOYL) AMINOACETO- AND AMINOPROPIONITRILES
Aldo J. Crovetti, Lake Forest, and Maynette V. Neundorf, Lake Bluff, Ill., assignors to Abbott Laboratories, North Chicago, Ill., a corporation of Illinois
No Drawing. Filed Apr. 22, 1966, Ser. No. 544,375
Int. Cl. C07c *121/52*
U.S. Cl. 260—465                                  7 Claims

ABSTRACT OF THE DISCLOSURE

Compounds having the formula:

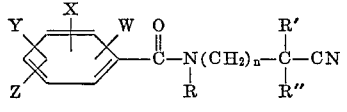

| | W | X | Y | Z | R | R' | R'' | n | Staph. aureus [1] | Proteus vulgaris [1] | Chaetonium globosum [1] | E. tenella [2] | T. vaginalis [1] |
|---|---|---|---|---|---|---|---|---|---|---|---|---|---|
| Cpd.: | | | | | | | | | | | | | |
| 1 | H | 2-Cl | 4-NO$_2$ | H | H | H | H | 0 | 6.2 | | 0.0125% | | 50 |
| 2 | H | 2-Cl | 4-NO$_2$ | H | CH$_3$ | H | H | 0 | 6.2 | | 0.0125% | | 100 |
| 3 | H | 2-Cl | 4-NO$_2$ | H | CH⟨CH$_2$—CH$_2$⟩ | H | H | 0 | 25 | | | 0.05% | |
| 4 | H | 2-Cl | 3-NO$_2$ | 5-NO$_2$ | H | H | H | 0 | 10 | 100 | | | 10 |
| 5 | 2-Cl | 3-NO$_2$ | 4-Cl | 5-NO$_2$ | H | H | H | 0 | 10 | | 100 | | 100 |

[1] Concentration in parts per million.
[2] Percent concentration in chicken feed.

in which n is 0 to 4, W is chloro, nitro, or methyl; X is hydrogen, chloro, nitro, amino, or methoxy; Y is hydrogen, chloro, nitro, or methyl; and Z is hydrogen or nitro; and wherein R represents diloweralkylamino loweralkyl and physiologically-acceptable salts thereof, hydrogen, loweralkyl-branched or cyclic, aryl, hydroxyloweralkyl, loweralkoxyloweralkyl, and cyanoloweralkyl; R' is hydrogen or methyl; and R'' is hydrogen, loweralkyl-branched or cyclic, or aryl, which compounds have antibacterial as well as antifungal and antiprotozal activity.

This invention relates to novel nitrile derivatives and to a process for producing same. More particularly, the invention relates to nitrile compounds having the formula:

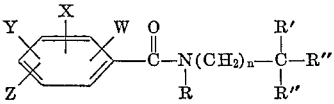

in which n is 0 to 4, W is chloro, nitro, or methyl; X is hydrogen, chloro, nitro, amino, or methoxy; Y is hydrogen, chloro, nitro, or methyl; and Z is hydrogen or nitro; and wherein R represents diloweralkylaminoloweralkyl and hydrochloride, hydrobromide and sulfate salts thereof, hydrogen, loweralkyl-branched or cyclic, aryl, hydroxyloweralkyl, loweralkoxyloweralkyl, and cyanoloweralkyl; R' is hydrogen or methyl; and R'' is hydrogen, loweralkyl-branched or cyclic, or aryl. The terms "loweralkyl" or "loweralkoxy" include the straight and branched alkyl and alkoxy radicals containing from one to four carbon atoms. "Cycloalkyl" includes radicals of from three to six carbon atoms.

The members of this new series of compounds have antibacterial as well as antifungal and antiprotozal activity. The in vitro activity of some of these compounds, against the indicated microorganisms, is illustrated in the following tables. The first table identifies the noted compounds with the indicated radicals referring to the general formula while the second table illustrates the minimum inhibitory concentration of the noted compounds against representative organisms.

Additionally, the compounds of the present invention possess herbicidal activity, both terrestrial and aquatic, and for this reason can be employed to control plant growth. The representative herbicidal activity of some of these compounds is illustrated in the following tables. The indicated radicals refer to the general formula above.

EFFECTIVE PRE-EMERGENCE ACTIVITY AGAINST CORN AND ALFALFA AT A LEVEL OF 100 p.p.m.

| | W | X | Y | Z | R | R' | R'' | n |
|---|---|---|---|---|---|---|---|---|
| 1 | 2-CH$_3$ | 3-NO$_2$ | 5-NO$_2$ | H | Methyl | H | H | 0 |
| 2 | 2-Cl | 4-NO$_2$ | H | H | Cyclopropyl | H | H | 0 |
| 3 | 2-Cl | 3-NO$_2$ | 5-Cl | H | Methyl | H | H | 0 |

EFFECTIVE HERBICIDAL ACTIVITY AGAINST THE AQUATIC PLANT ELODEA AT A LEVEL OF 10 p.p.m.

| | W | X | Y | Z | R | R' | R'' | n |
|---|---|---|---|---|---|---|---|---|
| 1 | 3-NO$_2$ | 4-Cl | 5-NO$_2$ | H | Methyl | H | H | 0 |
| 2 | 2-Cl | 3-NO$_2$ | 5-NO$_2$ | H | H | H | H | 0 |

The compounds of the present invention are prepared by the reaction of an appropriate aminonitrile and an appropriate benzoyl halide in a suitable reaction medium such as water or an inert solvent, i.e., benzene, ether, chloroform, dimethylformamide, dimethylacetamide, or dimethoxyethane in the presence of an acid acceptor, for example, sodium hydroxide, sodium carbonate, pyridine, or trialkylamine.

The following examples are presented to illustrate the invention.

Example I.—N-(2-chloro-4-nitrobenzoyl) aminoacetonitrile

A solution of 15.6 g. (0.39 M) sodium hydroxide and 41.4 g. (0.39 M) sodium carbonate in 200 ml. water is stirred and chilled to <10° C. To this is carefully added 60 g. (0.39 M) aminoacetonitrile hydrogen sulfate. Holding the temperature at <10° C., 84 g. (0.39 M) of 2-chloro-4-nitrobenzoyl chloride is added dropwise. Stirring in the cold is continued an hour followed by stirring at room temperature for 2 to 48 hours. The tan solid is filtered off, washed with a little water and crystallized from 50% ethanol, using activated charcoal to decolorize. After filtration and drying, 69 g. (74%) of N-(2-chloro-4-nitrobenzoyl)aminoacetonitrile is recovered, M.P. 126°–127°.

Example 2.—N-(4-amino-3,5-dichlorobenzoyl)-β-aminopropionitrile

A solution of 3.5 g. (0.05 M) β-aminopropionitrile and 5 g. (0.05 M) triethylamine in 30 ml. of dimethylacetamide is stirred and heated to 40° C. To this is added a warm solution of 11.2 g. (0.05 M) 4-amino-3,5-dichlorobenzoyl chloride in 20 ml. dimethylacetamide. After stirring at room temperature for another 2 hours, the mixture is diluted with water to 2 liters to obtain a white precipitate. This is filtered off and dried. After crystallization from benzene, 9.5 g. (74%) N-(4-amino-3,5-dichlorobenzoyl)-β-aminopropionitrile is recovered, M.P. 208°–209°.

Example 3.—N-β-(2-chloro-4-nitrobenzoyl)-N-ethylaminopropionitrile

A solution of 9.8 g. (0.1 M) N-ethylaminopropionitrile and 10.1 g. (0.1 M) triethylamine in 40 ml. dimethylformamide is stirred rapidly as a solution of 22 g. (0.1 M) 2-chloro-4-nitrobenzoyl chloride in 30 ml. dimethylformamide is added. The mixture is stirred and heated (steam bath) for an hour and then allowed to remain at room temperature for 20 hours. Most of the solvent is removed by vacuum distillation and the oily residue distilled. The fraction, B.P. 208°–212°/0.6 mm., weighs 8.3 g. (30%), $n_D^{25}$ 1.5640, and is N-β-(2-chloro-4-nitrobenzoyl)-N-ethylaminopropionitrile.

Example 4.—N-(2-chloro-4-nitrobenzoyl)-N-isopropylaminoacetonitrile

A solution of 9.8 g. (0.1 M) N-isopropylaminoacetonitrile and 10.1 g. (0.1 M) triethylamine in 50 ml. dry benzene is stirred as 22 g. (0.1 M) 2-chloro-4-nitrobenzoyl chloride in 50 ml. dry benzene is added dropwise. When addition is complete, the mixture is stirred and refluxed for 2 hours and then cooled to room temperature. The triethylamine hydrochloride is filtered off and the filtrate concentrated to an oil. This is crystallized from 95% ethanol using activated charcoal to decolorize. After vacuum drying, 17.1 g. (61%) N-(2-chloro-4-nitrobenzoyl)-N-isopropylaminoacetonitrile is recovered, M.P. 120°–122°.

In like manner, reacting the appropriate aminonitrile and benzoyl chloride in the manner exemplified will result in the formation of the following compounds of the present invention. In the following table, the column entitled "Method" refers to the foregoing examples as the method employed in making each of the compounds exemplified in Examples 5 to 70.

| Example | W | X | Y | Z | R | R' | R'' | n | Method | M.P., °C. | Formula | Calculated C | Calculated H | Calculated N | Found C | Found H | Found N |
|---|---|---|---|---|---|---|---|---|---|---|---|---|---|---|---|---|---|
| 5 | 3-Cl | 4-NH$_2$ | 5-Cl | H | H | H | H | 0 | 1 | 198–200 | C$_9$H$_7$Cl$_2$N$_3$O | 44.28 | 2.89 | 17.22 | 44.11 | 2.82 | 17.34 |
| 6 | 3-Cl | 4-NH$_2$ | 5-Cl | H | H | H | H | 1 | 2 | 210–212 | C$_{10}$H$_9$Cl$_2$N$_3$O | 46.53 | 3.51 | 16.28 | 46.63 | 3.78 | 16.47 |
| 7 | 3-Cl | 4-NH$_2$ | 5-Cl | H | CH$_3$ | H | H | 4 | 2 | 74–77 | C$_{13}$H$_{15}$Cl$_2$N$_3$O | 52.01 | 5.04 | 14.00 | 52.15 | 5.11 | 13.99 |
| 8 | 3-Cl | 4-NH$_2$ | 5-Cl | H | H | H | H | 0 | 3 | 96–98 | C$_{10}$H$_9$Cl$_2$N$_3$O | 46.53 | 3.51 | 16.28 | 46.72 | 3.52 | 16.31 |
| 9 | 3-Cl | 4-NH$_2$ | 5-Cl | H | CH$_3$ | CH$_3$ | CH$_3$ | 0 | 3 | 194–196 | C$_{11}$H$_{11}$Cl$_2$N$_3$O | 48.55 | 4.07 | 16.44 | 48.87 | 4.24 | 16.46 |
| 10 | 3-Cl | 4-NH$_2$ | 5-Cl | H | H | H | H | 1 | 2 | 147–148 | C$_{10}$H$_9$Cl$_2$N$_3$O | 56.48 | 5.63 | 12.35 | 56.44 | 5.63 | 12.43 |
| 11 | 3-Cl | 4-NH$_2$ | 5-Cl | H | H | H | H | 0 | 2 | 147–149 | C$_{10}$H$_9$Cl$_2$N$_3$O | 56.27 | 3.46 | 13.13 | 55.98 | 3.19 | 12.89 |
| 12 | 3-Cl | 4-NH$_2$ | 5-Cl | H | H | H | H | 0 | 2 | 158–160 | C$_{10}$H$_9$Cl$_2$N$_3$O | 55.22 | 5.25 | 12.88 | 55.36 | 5.44 | 13.03 |
| 13 | 3-Cl | 4-NO$_2$ | H | H | C$_2$H$_5$ | H | H | 0 | 2 | 85–87 | C$_{11}$H$_{11}$Cl$_2$N$_3$O$_3$ | 48.55 | 4.07 | 15.44 | 48.57 | 4.07 | 15.23 |
| 14 | 2-Cl | 4-NO$_2$ | H | H | H | H | H | 0 | 1 | 126–127 | C$_9$H$_6$ClN$_3$O$_3$ | 45.11 | 2.52 | 17.54 | 45.05 | 2.73 | 17.34 |
| 15 | 2-Cl | 4-NO$_2$ | H | H | C$_2$H$_5$ | H | H | 1 | 1 | 173–175 | C$_{11}$H$_{10}$ClN$_3$O$_3$ | 47.35 | 3.18 | 16.57 | 47.52 | 3.16 | 16.55 |
| 16 | 2-Cl | 4-NO$_2$ | H | H | CH$_3$ | H | H | 0 | 2 | 109–110 | C$_{10}$H$_8$ClN$_3$O$_3$ | 47.35 | 3.86 | 15.69 | 49.31 | 3.86 | 15.52 |
| 17 | 2-Cl | 4-NO$_2$ | H | H | CH$_3$ | H | H | 0 | 2 | 116–118 | C$_{10}$H$_{10}$ClN$_3$O$_3$ | 47.35 | 3.18 | 16.57 | 47.54 | 3.40 | 16.01 |
| 18 | 2-Cl | 4-NO$_2$ | H | H | H | H | H | 1 | 3 | 101–103 | C$_{10}$H$_{10}$ClN$_3$O$_3$ | 49.35 | 3.76 | 15.69 | 49.29 | 3.77 | 15.59 |
| 19 | 2-Cl | 4-NO$_2$ | H | H | C$_2$H$_5$ | H | H | 1 | 3 | b 0.5–0.6 208–212 | C$_{12}$H$_{12}$ClN$_3$O$_3$ | 51.16 | 4.29 | 14.91 | 50.97 | 4.19 | 15.08 |

| | W | X | Y | Z | R | R' | R'' | n | Method | M.P., °C. | Formula | Calculated C | Calculated H | Calculated N | Found C | Found H | Found N |
|---|---|---|---|---|---|---|---|---|---|---|---|---|---|---|---|---|---|
| 20 | 2-Cl | 4-NO₂ | H | H | CH<CH₃,CH₂ (cyclopropyl) | H | H | 0 | 4 | 135-137 | C₁₂H₁₀ClN₃O₃ | 51.53 | 3.60 | 15.02 | 51.50 | 3.71 | 14.87 |
| 21 | 2-Cl | 4-NO₂ | H | H | C₃H₇ | H | H | 0 | 4 | 88-90 | C₁₂H₁₂ClN₃O₃ | 51.16 | 4.29 | 14.91 | 51.44 | 4.43 | 15.03 |
| 22 | 2-Cl | 4-NO₂ | H | H | CH(CH₃)₂ | H | H | 0 | 4 | 120-122 | C₁₂H₁₂ClN₃O₃ | 51.16 | 4.29 | 14.91 | 51.28 | 4.15 | 14.83 |
| 23 | 2-Cl | 4-NO₂ | H | H | C₄H₉ | H | H | 0 | 4 | Oil | C₁₃H₁₄ClN₃O₃ | 52.79 | 4.77 | 14.21 | 52.67 | 4.84 | 14.18 |
| 24 | 2-Cl | 4-NO₂ | H | H | ⌬ (cyclohexyl) | H | H | 0 | 4 | 170-172 | C₁₅H₁₆ClN₃O₃ | 55.98 | 5.01 | 13.06 | 56.20 | 5.22 | 13.09 |
| 25 | 2-Cl | 4-NO₂ | H | H | Ph | CH₃ | H | 0 | 4 | 111-113 | C₁₆H₁₆ClN₃O₃ | 57.06 | 3.19 | 13.31 | 57.26 | 3.18 | 13.31 |
| 26 | 2-Cl | 4-NO₂ | H | H | H | H | CH₃ | 0 | 4 | 176-179 | C₁₁H₁₀ClN₃O₃ | 49.35 | 3.76 | 15.69 | 49.42 | 3.70 | 15.68 |
| 27 | 2-Cl | 4-NO₂ | H | H | CH₂CH₂N(C₂H₅)₂ · HCl | H | H | 0 | 4 | 181-183 | C₁₅H₁₆Cl₂N₄O₃ | 48.00 | 5.37 | 14.93 | 47.80 | 5.43 | 15.10 |
| 28 | 2-Cl | 4-NO₂ | H | H | CH₂CH₂N(C₂H₅)₂ · HCl | H | H | 1 | 4 | 120-121 | C₁₀H₁₈ClN₃O₃ | 57.23 | 5.40 | 12.52 | 57.19 | 5.49 | 12.55 |
| 29 | 2-Cl | 4-NO₂ | H | H | CH₂CH₂OC₂H₅ | H | H | 0 | 4 | 83-84 | C₁₃H₁₄ClN₃O₄ | 50.08 | 4.52 | 13.48 | 50.20 | 4.29 | 13.44 |
| 30 | 2-Cl | 4-NO₂ | H | H | CH₂CH₂N(C₂H₅)₃ Br⁻ | H | H | 0 | 4 | 202 | C₁₇H₂₄BrClN₄O₃ | 45.59 | 5.40 | 12.51 | 45.37 | 57.2 | 12.68 |
| 31 | 2-Cl | 4-NO₂ | H | H | CH₂CH₂CN | H | H | 0 | 4 | 133-135 | C₁₂H₉Cl₂N₃O₃ | 49.24 | 3.09 | 19.14 | 49.05 | 3.28 | 19.09 |
| 32 | 2-Cl | 4-NO₂ | H | H | CH₂CH₂CN | H | H | 0 | 1 | 149-150 | C₁₁H₇ClN₄O₃ | 47.40 | 2.53 | 20.10 | 47.35 | 2.41 | 20.30 |
| 33 | 2-Cl | 4-NO₂ | H | H | CH₂CH₂N(CH₃)₂ · HCl | H | H | 0 | 4 | 220-222 | C₁₃H₁₅Cl₂N₄O₃ | 44.96 | 4.64 | 16.13 | 44.76 | 4.71 | 16.26 |
| 34 | 2-Cl | 4-NO₂ | H | H | CH₂CH₂OH | H | H | 0 | 4 | 191-193 | C₁₁H₁₀ClN₃O₄ | 46.38 | 3.56 | 14.86 | 46.58 | 3.70 | 14.88 |
| 35 | 2-Cl | 4-NO₂ | H | H | CH₂OH | H | CH₃ | 1 | 4 | 189-190 | C₁₁H₁₀ClN₃O₄ | 49.35 | 3.76 | 15.69 | 49.63 | 3.64 | 15.70 |
| 36 | 2-Cl | 4-NO₂ | H | H | H | H | H | 0 | 1 | 112-118 | C₉H₈ClN₃O₃ | 44.54 | 2.99 | 15.58 | 44.47 | 3.03 | 15.41 |
| 37 | 2-Cl | 3-NO₂ | H | H | H | H | H | 0 | 1 | 144-146 | C₉H₈ClN₃O₃ | 45.20 | 2.52 | 17.54 | 45.20 | 2.47 | 17.41 |
| 38 | 2-Cl | 2-NO₂ | H | H | H | H | H | 0 | 1 | 131-133 | C₉H₆ClN₃O₃ | 45.11 | 2.52 | 17.54 | 45.25 | 2.61 | 17.34 |
| 39 | 2-Cl | 5-NO₂ | H | H | H | H | H | 0 | 1 | 161-163 | C₉H₈ClN₃O₃ | 45.11 | 3.44 | 20.48 | 44.86 | 2.62 | 17.73 |
| 40 | 4-NO₂ | H | H | H | H | H | H | 0 | 2 | 140-141 | C₉H₆N₄O₃ | 52.68 | 2.52 | 20.50 | 52.59 | 3.35 | 20.50 |
| 41 | 4-NO₂ | 4-NO₂ | H | H | CH₃ | H | H | 0 | 1 | 89-90 | C₉H₆N₄O₃ | 54.79 | 4.14 | 19.17 | 54.92 | 3.44 | 19.79 |
| 42 | 3-NO₂ | 4-NO₂ | H | H | CH₃ | H | H | 0 | 1 | 175-177 | C₁₀H₉N₃O₃ | 43.21 | 2.42 | 22.41 | 43.28 | 4.03 | 22.24 |
| 43 | 3-NO₂ | 4-NO₂ | H | H | C₂H₅ | H | H | 0 | 2 | 122-124 | C₁₁H₁₁N₃O₅ | 45.46 | 3.05 | 21.21 | 45.72 | 2.54 | 21.28 |
| 44 | 3-NO₂ | H | 5-CH₃ | H | CH₃ | H | H | 0 | 4 | 133-135 | C₁₁H₁₁N₃O₃ | 47.48 | 3.62 | 20.14 | 47.36 | 3.63 | 20.13 |
| 45 | 3-NO₂ | H | 5-Cl | H | C₂H₅ | H | H | 0 | 1 | 156-157 | C₁₁H₁₁ClN₃O₄ | 56.65 | 4.75 | 17.87 | 56.74 | 4.78 | 18.07 |
| 46 | 4-CH₃O | 5-Cl | H | H | CH₃ | H | H | 0 | 4 | 136-138 | C₉H₁₁N₃O₄ | 51.06 | 3.86 | 18.02 | 51.08 | 3.94 | 17.93 |
| 47 | 3-NO₂ | 5-NO₂ | H | H | C₂H₅ | H | H | 0 | 4 | 176-177 | C₉H₆Cl₂N₃O₅ | 39.43 | 1.83 | 15.33 | 39.66 | 1.58 | 15.53 |
| 48 | 3-NO₂ | 4-Cl | H | H | CH₃ | H | H | 0 | 4 | 99-101 | C₁₁H₁₁Cl₂N₃O₃ | 43.72 | 3.00 | 13.90 | 44.02 | 3.03 | 13.74 |
| 49 | 3-NO₂ | 4-Cl | H | H | C₂H₅ | H | H | 0 | 4 | 137-139 | C₁₁H₁₁ClN₃O₅ | 51.68 | 2.44 | 14.58 | 51.80 | 2.51 | 14.88 |
| 50 | 3-NO₂ | 4-NO₂ | H | H | CH₃ | H | H | 0 | 2 | 235-237 | C₉H₆ClN₃O₅ | 37.97 | 1.77 | 19.68 | 38.15 | 1.87 | 19.73 |
| 51 | 3-NO₂ | 4-NO₂ | H | H | CH₃ | H | H | 0 | 4 | 118-120 | C₁₀H₁₀ClN₃O₅ | 42.25 | 2.86 | 19.68 | 42.43 | 2.55 | 18.49 |
| 52 | 3-NO₂ | 4-NO₂ | H | H | C₂H₅ | H | H | 0 | 4 | 180-182 | C₁₀H₇ClN₄O₅ | 37.97 | 1.77 | 19.68 | 38.14 | 2.36 | 19.72 |
| 53 | 3-NO₂ | 4-NO₂ | H | H | CH₃ | H | H | 0 | 4 | 193-195 | C₁₀H₇ClN₄O₅ | 40.18 | 2.36 | 17.92 | 40.23 | 2.48 | 17.77 |
| 54 | 3-NO₂ | 4-Cl | H | 5-NO₂ | CH₃ | H | H | 0 | 4 | 131-133 | C₁₀H₇ClN₄O₅ | 40.18 | 2.36 | 17.92 | 40.20 | 2.55 | 18.49 |
| 55 | 2-Cl | 3-NO₂ | H | 5-NO₂ | C₂H₅ | H | H | 0 | 4 | 178-180 | C₁₁H₉Cl₂N₄O₅ | 42.25 | 2.90 | 17.92 | 42.36 | 2.94 | 18.96 |
| 56 | 2-Cl | 3-NO₂ | H | 5-NO₂ | CH₃ | H | H | 0 | 4 | 155-157 | C₁₀H₈Cl₂N₄O₅ | 36.05 | 1.81 | 16.14 | 35.90 | 1.92 | 17.85 |
| 57 | 2-Cl | 3-NO₂ | H | 5-NO₂ | C₂H₅ | H | H | 0 | 1 | 183-186 | C₉H₆Cl₂N₄O₅ | 38.05 | 2.32 | 16.82 | 38.16 | 2.18 | 16.85 |
| 58 | 2-Cl | 3-NO₂ | H | 5-NO₂ | H | H | H | 0 | 1 |  | C₉H₆Cl₂N₄O₅ | 33.87 | 1.26 | 17.56 | 34.05 | 1.49 | 17.55 |

With respect to the compound of Example 36, this can be made most conveniently by refluxing the compound of Example 32 with a 37% formaldehyde solution for 2½ hours and then diluting with water. The oil which separates solidifies, after drying in vacuo, the resulting product having a melting point of 112°–118° C.

What is claimed is:

1. A compound of the formula

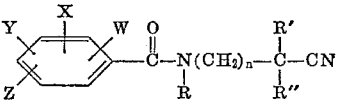

wherein:
  n is 0 to 1 inclusive except that when R, R' and R" are all hydrogen, n is 4;
  W is selected from the group consisting of chloro, nitro, and methyl;
  X is selected from the group consisting of hydrogen, chloro, nitro, amino and methoxy;
  Y is selected from the group consisting of hydrogen, chloro, nitro, and methyl;
  Z is selected from the group consisting of hydrogen and nitro;
  R is selected from the group consisting of diloweralkyl-aminoloweralkyl and hydrochloride, hydrobromide and sulfate salts thereof, hydrogen, loweralkyl, phenyl, hydroxyloweralkyl, loweralkoxyloweralkyl and cyanoloweralkyl; and
  R' and R" are each selected from the group consisting of hydrogen and methyl; provided that when n is 0 or 1 and two of R, R' and R" are hydrogen, the other is a member other than hydrogen.

2. A compound as claimed in claim 1 in which n is 0, 1, and 4; W is 3-chloro; X is 4-amino; Y is 5-chloro, Z is hydrogen; R is selected from the group consisting of hydrogen, loweralkyl, and phenyl; and R' and R" are hydrogen provided that when n is 0 or 1, R is loweralkyl.

3. A compound as claimed in claim 1 in which n is 0 and 1; W is 2-chloro; X is 4-nitro; Y is hydrogen; Z is hydrogen; R is loweralkyl; and R' and R" are hydrogen.

4. A compound as claimed in claim 1 in which n is 0; W is 2-methyl; X is 3-nitro; Y is 5-nitro; Z is hydrogen; R is loweralkyl; and R' and R" are hydrogen.

5. A compound as claimed in claim 1 in which n is 0; W is 2-chloro; X is 3-nitro; Y is 5-chloro; Z is hydrogen; R is loweralkyl; and R' and R" are hydrogen.

6. A compound as claimed in claim 1 in which n is 0; W is 2-chloro; X is 3-nitro; Y is 4-chloro; Z is 5-nitro; R is loweralkyl; and R' and R" are hydrogen.

7. A compound as claimed in claim 1 in which n is 0; W is 2-chloro; X is 3-nitro; Y is 5-nitro; Z is hydrogen; R is loweralkyl; and R' and R" are hydrogen.

References Cited

UNITED STATES PATENTS

| | | | |
|---|---|---|---|
| 3,187,041 | 6/1965 | Richter | 260—558 |
| 3,187,042 | 6/1965 | Richter | 260—558 |
| 2,927,126 | 3/1960 | Pursglove | 260—465 |
| 3,027,248 | 3/1962 | Koopman et al. | 71—105 X |
| 3,205,258 | 9/1965 | Simonian et al. | 260—465 |
| 3,254,984 | 6/1966 | Johnson | 71—105 X |

FOREIGN PATENTS 248,214   3/1964   Netherlands.

FLOYD D. HIGEL, Primary Examiner
S. T. LAWRENCE III, Assistant Examiner

U.S. Cl. X.R.

71—66, 105; 99—4; 260—465.5, 544; 424—304